(12) United States Patent
Calarco et al.

(10) Patent No.: US 6,592,982 B2
(45) Date of Patent: Jul. 15, 2003

(54) FLEXIBLE GRAPHITE CAPACITOR ELEMENT

(75) Inventors: Paul Calarco, Westlake, OH (US); Robert Angelo Mercuri, Seven Hills, OH (US); Thomas William Weber, Cleveland, OH (US)

(73) Assignee: Graftech, Inc., Lakewood, OH (US)

( * ) Notice: Subject to any disclaimer, the term of this patent is extended or adjusted under 35 U.S.C. 154(b) by 0 days.

(21) Appl. No.: 10/106,012

(22) Filed: Mar. 25, 2002

(65) Prior Publication Data

US 2002/0132103 A1 Sep. 19, 2002

Related U.S. Application Data

(63) Continuation of application No. 09/523,852, filed on Mar. 13, 2000, now Pat. No. 6,410,128.

(51) Int. Cl.[7] .................................................. B23B 3/10
(52) U.S. Cl. ................. 428/313.9; 428/158; 428/319.3; 429/231.8; 429/245
(58) Field of Search .......................... 428/131, 319.1, 428/313.7, 313.9, 158; 429/231.8, 241, 245, 247, 129

(56) References Cited

U.S. PATENT DOCUMENTS

| | | | | |
|---|---|---|---|---|
| 4,752,518 A | * | 6/1988 | Lohrke et al. | |
| 5,102,855 A | | 4/1992 | Greinke et al. | 502/425 |
| 5,192,432 A | | 3/1993 | Andelman | 210/198 |
| 5,196,115 A | | 3/1993 | Andelman | 210/198 |
| 5,200,068 A | | 4/1993 | Andelman | 210/198 |
| 5,360,540 A | | 11/1994 | Andelman | 210/198 |
| 5,415,768 A | | 5/1995 | Andelman | 210/198 |
| 5,476,679 A | | 12/1995 | Lewis et al. | 427/122 |
| 5,547,581 A | | 8/1996 | Andelman | 210/656 |
| 5,620,597 A | | 4/1997 | Andelman | 210/198 |
| 5,748,437 A | | 5/1998 | Andelman | 361/302 |
| 5,779,891 A | | 7/1998 | Andelman | 210/198 |

FOREIGN PATENT DOCUMENTS

| JP | 01050365 | * | 2/1989 |
|---|---|---|---|
| JP | 10054820 | * | 2/1998 |

* cited by examiner

*Primary Examiner*—Tom Dunn
*Assistant Examiner*—Colleen P. Cooke
(74) *Attorney, Agent, or Firm*—Paul S. Chirgott

(57) ABSTRACT

Fluid permeable graphite article in the form of a glassy carbon coated perforated flexible graphite sheet useful as an electrode and electrically conductive backing material in flow-through type electrical capacitors.

18 Claims, 9 Drawing Sheets

(PRIOR ART)

FLEXIBLE GRAPHITE CAPACITOR ELEMENT

The present application is a continuation of application Ser. No. 09/523,852 filed Mar. 13, 2000, now U.S. Pat. No. 6,410,128 the details of which are incorporated herein by reference.

FIELD OF THE INVENTION

This invention relates to an article of flexible graphite sheet, having a coating of glassy carbon, which is fluid permeable in a transverse direction with enhanced isotropy with respect to thermal and electrical conductivity and enhanced resistance to chemical attack. This article can be used as an electrically conductive element in an electrical capacitor of the flow-through type. In a particular embodiment, natural cellulosic fibers are included in the glassy carbon coating and are carbonized and activated.

BACKGROUND OF THE INVENTION

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as basal planes, are linked or bonded together and groups thereof are arranged in crystallites. Highly ordered graphites consist of crystallites of considerable size: the crystallites being highly aligned or oriented with respect to each other and having well ordered carbon layers. In other words, highly ordered graphites have a high degree of preferred crystallite orientation. It should be noted that graphites possess anisotropic structures and thus exhibit or possess many properties which are highly directional e.g. thermal and electrical conductivity and fluid diffusion. Briefly, graphites may be characterized as laminated structures of carbon, that is, structures consisting of superposed layers or laminae of carbon atoms joined together by weak van der Waals forces. In considering the graphite structure, two axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. The natural graphites suitable for manufacturing flexible graphite possess a very high degree of orientation.

As noted above, the bonding forces holding the parallel layers of carbon atoms together are only weak van der Waals forces. Natural graphites can be treated so that the spacing between the superposed carbon layers or laminae can be appreciably opened up so as to provide a marked expansion in the direction perpendicular to the layers, that is, in the "c" direction and thus form an expanded or intumesced graphite structure in which the laminar character of the carbon layers is substantially retained.

Natural graphite flake which has been greatly expanded and more particularly expanded so as to have a final thickness or "c" direction dimension which is at least 80 or more times the original "c" direction dimension can be formed without the use of a binder into cohesive or integrated flexible graphite sheets of expanded graphite, e.g. webs, papers, strips, tapes, or the like. The formation of graphite particles which have been expanded to have a final thickness or "c" dimension which is at least 80 times the original "c" direction dimension into integrated flexible sheets by compression, without the use of any binding material is believed to be possible due to the excellent mechanical interlocking, or cohesion which is achieved between the voluminously expanded graphite particles.

In addition to flexibility, the sheet material, as noted above, has also been found to possess a high degree of anisotropy with respect to thermal and electrical conductivity and fluid diffusion, comparable to the natural graphite starting material due to orientation of the expanded graphite particles substantially parallel to the opposed faces of the sheet resulting from very high compression, e.g. roll pressing. Sheet material thus produced has excellent flexibility, good strength and a very high degree of orientation.

Briefly, the process of producing flexible, binderless anisotropic graphite sheet material, e.g. web, paper, strip, tape, foil, mat, or the like, comprises compressing or compacting under a predetermined load and in the absence of a binder, expanded graphite particles which have a "c" direction dimension which is at least 80 times that of the original particles so as to form a substantially flat, flexible, integrated graphite sheet. The expanded graphite particles which generally are worm-like or vermiform in appearance, once compressed, will maintain the compression set and alignment with the opposed major surfaces of the sheet. The density and thickness of the sheet material can be varied by controlling the degree of compression. The density of the sheet material can be within the range of from about 5 pounds per cubic foot to about 125 pounds per cubic foot. The flexible graphite sheet material exhibits an appreciable degree of anisotropy due to the alignment of graphite particles parallel to the major opposed, parallel surfaces of the sheet, with the degree of anisotropy increasing upon roll pressing of the sheet material to increased density. In roll pressed anisotropic sheet material, the thickness, i.e. the direction perpendicular to the opposed, parallel sheet surfaces comprises the "c" direction and the directions ranging along the length and width, i.e. along or parallel to the opposed, major surfaces comprises the "a" directions and the thermal, electrical and fluid diffusion properties of the sheet are very different, by orders of magnitude, for the "c" and "a" directions.

This very considerable difference in properties, i.e. anisotropy, which is directionally dependent, can be disadvantageous in some applications. For example, in gasket applications where flexible graphite sheet is used as the gasket material and in use is held tightly between metal surfaces, the diffusion of fluid, e.g. gases or liquids, occurs more readily parallel to and between the major surfaces of the flexible graphite sheet. It would, in most instances, provide for improved gasket performance, if the resistance to fluid flow parallel to the major surfaces of the graphite sheet ("a" direction) were increased, even at the expense of reduced resistance to fluid diffusion flow transverse to the major faces of the graphite sheet ("c" direction). With respect to electrical properties, the resistivity of anisotropic flexible graphite sheet is high in the direction transverse to the major surfaces ("c" direction) of the flexible graphite sheet, and substantially less in the direction parallel to and between the major faces of the flexible graphite sheet ("a" direction). In applications such as certain components for electrochemical cells, it would be of advantage if the electrical resistance transverse to the major surfaces of the flexible graphite sheet ("c" direction) were decreased, even at the expense of an increase in electrical resistivity in the direction parallel to the major faces of the flexible graphite sheet ("a" direction).

With respect to thermal properties, the thermal conductivity of a flexible graphite sheet in a direction parallel to the upper and lower surfaces of the flexible graphite sheet is relatively high, while it is relatively very low in the "c" direction transverse to the upper and lower surfaces.

Another carbon based material having unique properties is glassy carbon.

As used herein and as described in U.S. Pat. No. 5,476,679, the disclosure of which is incorporated herein by reference, glassy carbon is a monolithic non-graphitizable carbon with a high isotropy of the structure and physical properties and with a low permeability for gases and liquids. Glassy carbon typically also has a pseudo-glassy appearance. Glassy carbon can be formed from a non-graphitizing carbon-containing thermosetting resin such as synthetic or natural resins. Thermosetting resins that become rigid on heating and do not significantly soften upon reheating and are particularly effective. The principal groups of resins suitable for use in this invention are phenolics, polymers of furfural and furfuryl alcohol, as well as urethanes, which are minimally useful due to low carbon yields. The preferred phenolics are phenol formaldehyde and resorcinol-formaldehyde. Furan based polymers derived from furfural or furfuryl alcohol are also suitable for use in this invention. The resin system should preferably give a carbon yield in excess of about 20% and have a viscosity below about 200–300 cps. In addition to solutions of phenolics in furfural and furfuryl alcohol, straight furfural or furfuryl alcohol can be used with a catalyst. For example, a solution of furfural and an acid catalyst could be coated on a surface and then cured and carbonized to form glassy carbon.

Glassy carbon can prevent diffusion of contaminants and since glassy carbon is harder than graphite, glassy carbon will also provide protection from flaking, scratching and other defects and glassy carbon, unlikely glass itself, is a relatively good conductor.

The aforedescribed materials, in combination, are advantageously employed in a flow-through capacitor described in U.S. Pat. No. 5,779,891, the disclosure of which is incorporated herein by reference.

The flow-through capacitor, used in the separation and other treatment of fluids, and more fully described hereinafter, comprises at least one anode and at least one cathode adapted to be connected to a power supply, the capacitor arranged and constructed for use in the separation, electrical purification, concentration, recovery or electrochemical treatment or breakdown of solutes or fluids.

The capacitor includes one or more spaced apart pairs of anode and cathode electrodes incorporating a high surface area electrically conductive material and characterized by an open, short solute or fluid flow path, which flow paths are in direct communication with the outside of the capacitor.

SUMMARY OF THE INVENTION

In accordance with the present invention, a graphite article is provided comprising a compressed mass of expanded graphite particles in the form of a sheet having parallel, opposed first and second surfaces, at least one of the parallel opposed surfaces having an adherent coating of glassy carbon. The coated sheet, in at least a portion thereof, has a plurality of transverse fluid channels passing through said sheet between the parallel, opposed first and second surfaces, the channels being formed by mechanically impacting a surface of the sheet to displace graphite within the sheet at a plurality of predetermined locations to provide the channels with openings at the first and second parallel opposed surfaces. In a preferred embodiment, the inner surface of the channels have an adherent coating of glassy carbon whereby chemical and erosive attack at the channel sidewalls is avoided. The article of the present invention is useful as an electrically conductive backing material and electrode for use in "flow through" type capacitors.

BRIEF DESCRIPTION OF THE DRAWINGS

FIG. 1 is a plan view of a transversely permeable sheet of flexible graphite having transverse channels without any coating;

FIG. 1(A) shows a flat-ended protrusion element used in making the channels in the perforated sheet of FIG. 1;

FIG. 2 is a side elevation view in section of the sheet of FIG. 1;

FIGS. 2(A), (B), (C) and (D) show various suitable flat-ended configurations for forming transverse channels in accordance with the present invention;

DETAILED DESCRIPTION OF THE INVENTION

Graphite is a crystalline form of carbon comprising atoms covalently bonded in flat layered planes with weaker bonds between the planes. By treating particles of graphite, such as natural graphite flake, with an intercalant of, e.g. a solution of sulfuric and nitric acid, the crystal structure of the graphite reacts to form a compound of graphite and the intercalant. The treated particles of graphite are hereafter referred to as "particles of intercalated graphite." Upon exposure to high temperature, the particles of intercalated graphite expand in dimension as much as 80 or more times its original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets which, unlike the original graphite flakes, can be formed and cut into various shapes and provided with small transverse openings by deforming mechanical impact.

A common method for manufacturing graphite sheet, e.g. foil from flexible graphite is described by Shane et al in U.S.

Pat. No. 3,404,061, the disclosure of which is incorporated herein by reference. In the typical practice of the Shane et al method, natural graphite flakes are intercalated by dispersing the flakes in a solution containing an oxidizing agent of, e.g. a mixture of nitric and sulfuric acid. The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid.

In a preferred embodiment, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solutions may contain metal halides such as ferric chloride, and ferric chloride mixed with sulfuric acid, or a halide, such as bromine as a solution of bromine and sulfuric acid or bromine in an organic solvent.

After the flakes are intercalated, any excess solution is drained from the flakes and the flakes are water-washed. The quantity of intercalation solution retained on the flakes after draining may range from 20 to 150 parts of solution by weight per 100 parts by weight of graphite flakes (pph) and more typically about 50 to 120 pph. Alternatively, the quantity of the intercalation solution may be limited to between 10 to 50 parts of solution per hundred parts of graphite by weight (pph) which permits the washing step to be eliminated as taught and described in U.S. Pat. No. 4,895,713, the disclosure of which is also herein incorporated by reference. The thus treated particles of graphite are sometimes referred to as "particles of intercalated graphite." Upon exposure to high temperature, e.g. 300° C. and up to 700° C. to 1000° C. and higher, the particles of intercalated graphite expand as much as 80 to 1000 or more times its original volume in an accordion-like fashion in the c-direction, i.e. in the direction perpendicular to the crystalline planes of the constituent graphite particles. The expanded, i.e. exfoliated graphite particles are vermiform in appearance, and are therefore commonly referred to as worms. The worms may be compressed together into flexible sheets which, unlike the original graphite flakes, can be formed and cut into various shapes and provided with small transverse openings by deforming mechanical impact as hereinafter described.

Flexible graphite sheet and foil are coherent, with good handling strength, and are suitably compressed, e.g. by roll-pressing, to a thickness of 0.003 to 0.15 inch and a density of 0.1 to 1.5 grams per cubic centimeter. From about 1.5–30% by weight of ceramic additives, can be blended with the intercalated graphite flakes as described in U.S. Pat. No. 5,902,762 (which is incorporated herein by reference) to provide enhanced resin impregnation in the final flexible graphite product. The additives include ceramic fiber particles having a length of 0.15 to 1.5 millimeters. The width of the particles is suitably from 0.04 to 0.004 mm. The ceramic fiber particles are non-reactive and non-adhering to graphite and are stable at temperatures up to 2000° F., preferably 2500° F. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

Figures 1, 1A, 2, 2A, 2B, 2C:
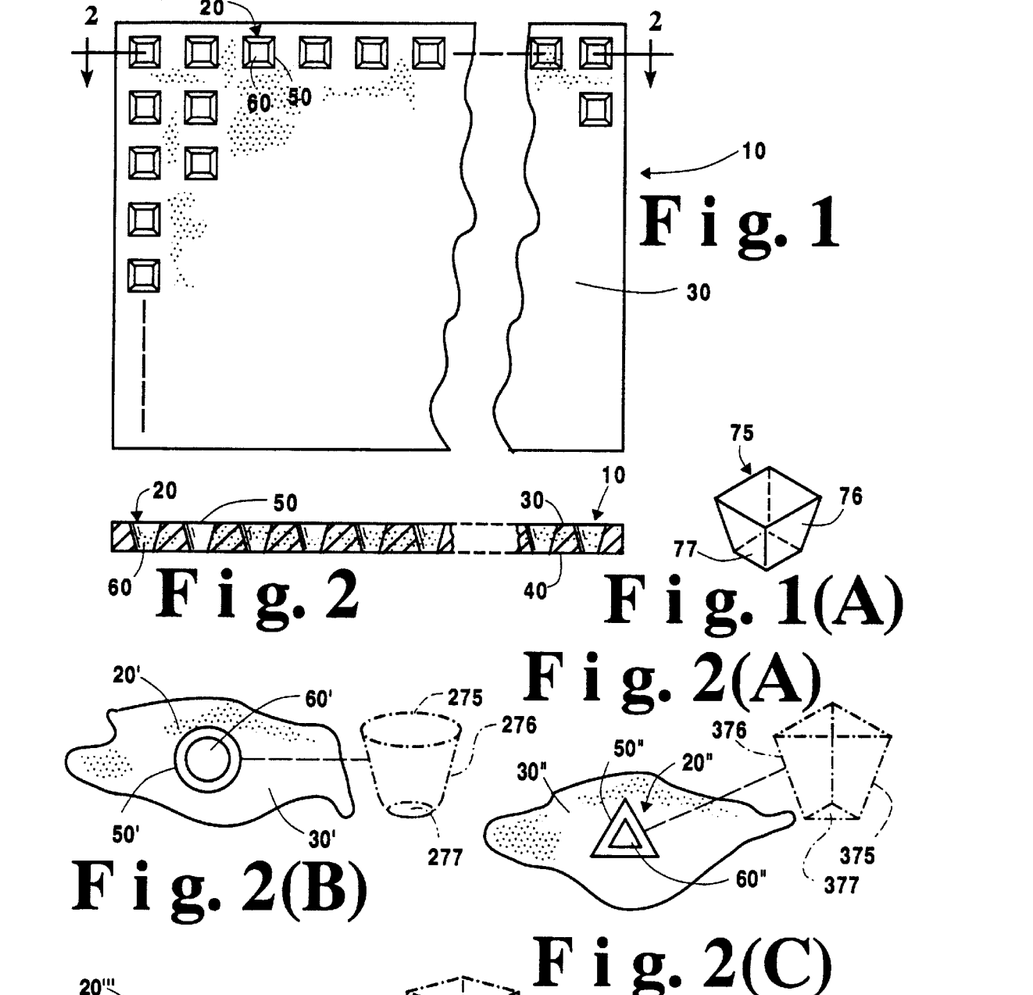
Figure 2D:
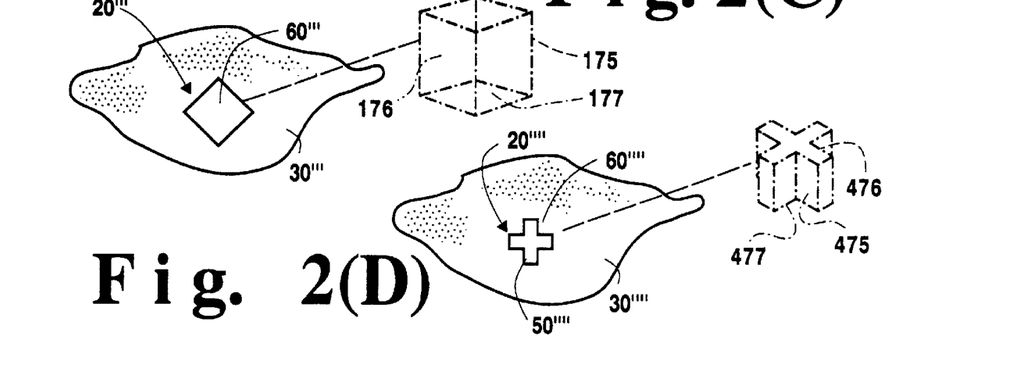
Figure 3:
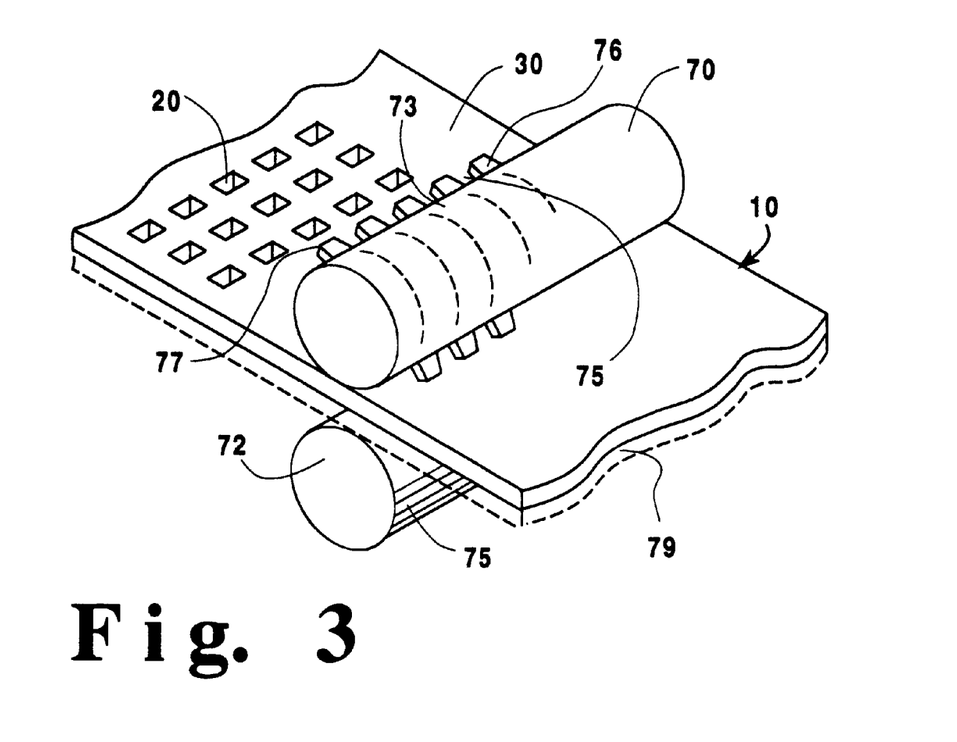
FIGS. 3, 3(A) shows a mechanism for making the article of FIG. 1.
Figure 3A:
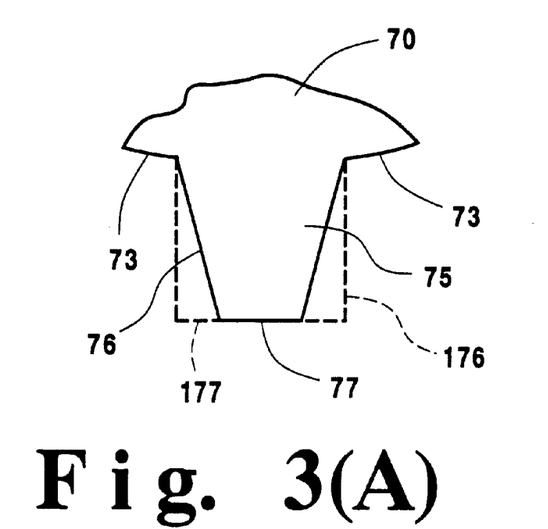
Figure 4:
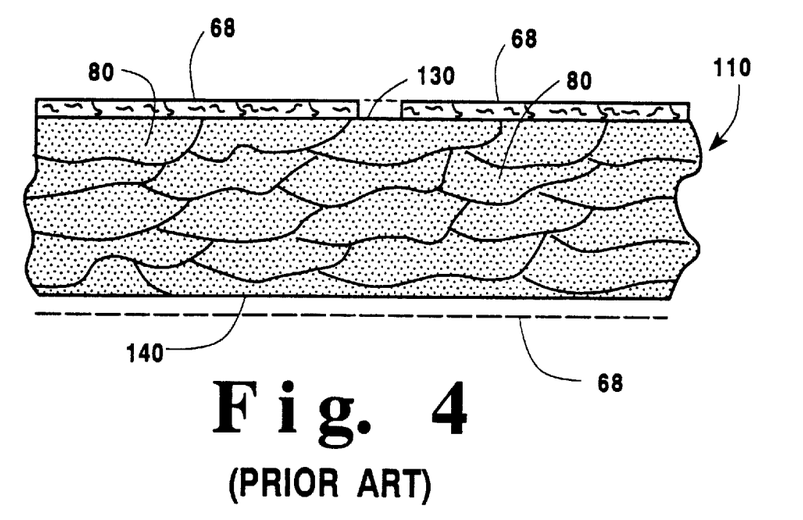
FIG. 4 shows an enlarged sketch of an elevation view of a sheet of prior art flexible graphite sheet material having a glassy carbon coating.
Figure 5:
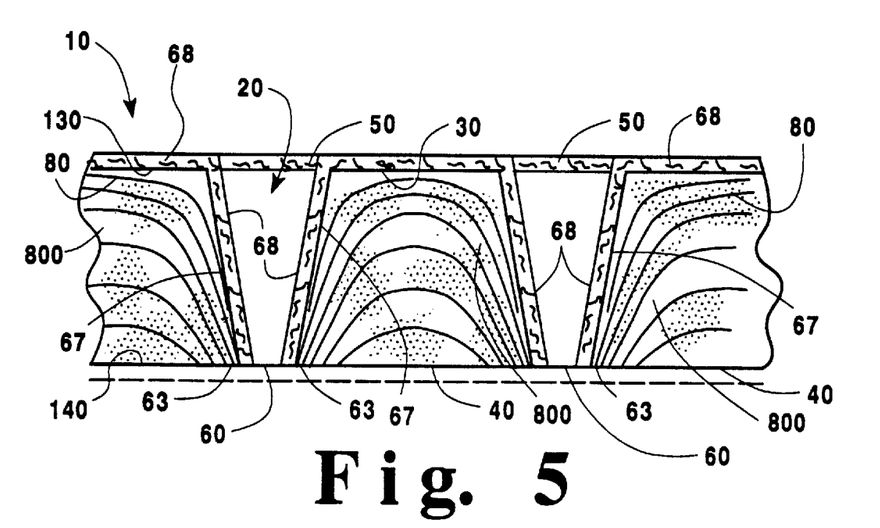
FIG. 5 is a sketch of an enlarged elevation view of a glassy carbon coated article formed of flexible graphite sheet in accordance with the present invention.

With reference to FIG. 1 and FIG. 2, a compressed mass of expanded graphite particles, in the form of a flexible graphite sheet is shown at 10. The flexible graphite sheet 10 is provided with channels 20, which are preferably smooth-sided as indicated at 67 in FIG. 5, and which pass between the parallel, opposed surfaces 30, 40 of flexible graphite sheet 10. The channels 20, in a particular embodiment, have openings 50 on one of the opposed surfaces 30 which are larger than the openings 60 in the other opposed surface 40. The channels 20 can have different configurations as shown at 20'-20"" in FIGS. 2(A), 2(B), 2(C), 2(D), which are formed using flat-ended protrusion elements of different shapes as shown at 75, 175, 275, 375, 475 in FIGS. 1(A) and 2(A), 2(B), 2(C), 2(D), suitably formed of metal, e.g. steel and integral with and extending from the pressing roller 70 of the impacting device shown in FIG. 3. The smooth flat-ends of the protrusion elements, shown at 77, 177, 277, 377, 477, and the smooth bearing surface 73, of roller 70, and the smooth bearing surface 78 of roller 72 (or alternatively flat metal plate 79), ensure deformation and displacement of graphite within the flexible graphite sheet, i.e. there are little or no rough or ragged edges or debris resulting from the channel-forming impact. For some applications, preferred protrusion elements have decreasing cross-section in the direction away from the pressing roller 70 to provide larger channel openings on the side of the sheet which is initially impacted. The channels 20 in the sheet of compressed expanded graphite particles are dimensioned to increase the surface area of the sheet, i.e. the side wall area of a channel exceeds the surface area removed by formation of the channel; when the ratio of the average width of the channel to the thickness of the sheet is equal to or less than "one", the surface area is increased by a factor of 2 (or more as the ratio decreases). The development of smooth, unobstructed surfaces 63 surrounding channel openings 603 enables the formation of a smooth, conformal, glassy carbon coating 68 and free flow of fluid into and through smooth-sided (at 67) channels 20. In a particular embodiment, openings one of the opposed surfaces are larger than the channel openings in the other opposed surface, e.g. from 1 to 200 times greater in area, and result from the use of protrusion elements having converging sides such as shown at 76, 276, 376. The channels 20 are formed in the flexible graphite sheet 10 at a plurality of pre-determined locations by mechanical impact at the predetermined locations in sheet 10 using a mechanism such as shown in FIG. 3 comprising a pair of steel rollers 70, 72 with one of the rollers having truncated, i.e. flat-ended, prism-shaped protrusions 75 which impact surface 30 of flexible graphite sheet 10 to displace graphite and penetrate sheet 10 to form open channels 20. In practice, both rollers 70, 72 can be provided with "out-of-register" protrusions, and a flat metal plate indicated at 79, can be used in place of smooth-surfaced roller 72. FIG. 4 is an enlarged sketch of a sheet of flexible graphite 110, having a glassy carbon coating 68; graphite sheet 110 shows a typical prior art orientation of compressed expanded graphite particles 80 substantially parallel to the opposed surfaces 130, 140. This orientation of the expanded graphite particles 80 results in anisotropic properties in flexible graphite sheets; i.e. the electrical conductivity and thermal conductivity of the sheet being substantially lower in the direction transverse to opposed surfaces 130, 140 ("c" direction) than in the direction ("a"direction) parallel to opposed surfaces 130, 140. In the course of impacting flexible graphite sheet 10 to form channels 20, as illustrated in FIG. 3, graphite is displaced within flexible graphite sheet 10 by flat-ended (at 77) protrusions 75 to push aside graphite as it travels to and bears against smooth surface 73 of roller 70 to disrupt and deform the parallel orientation of expanded graphite particles 80 as shown at 800 in FIG. 5. This region of 800, adjacent channels 20, shows disruption of the parallel orientation into an oblique, non-parallel orientation is optically observable at magnifications of 100× and higher. In effect the displaced graphite is being "die-molded" by the sides 76 of adjacent protrusions 75 and the smooth surface 73 of roller 70 as illustrated in FIG. 5. This reduces the anisotropy in flexible graphite sheet 10 and thus increases the electrical and thermal conductivity of sheet 10 in the direction transverse to the opposed surfaces 30, 40. A similar effect is achieved with frusto-conical and parallel-sided peg-shaped flat-ended protrusions 275 and 175 and protrusions 375, 475. The glassy carbon coating 68 on the surfaces of flexible graphite sheet 10 is achieved by deforming a glassy carbon coated flexible graphite sheet, such as shown in FIG. 4, or by treating a channeled sheet such as shown in FIG. 1, with a resin solution and subsequently converting the resin to glassy carbon. The glassy carbon coated perforated fluid permeable flexible graphite sheet 10 of FIG. 5 can be used in an electrode and electrically conducting backing material in a flow-through capacitor of the type shown schematically in FIGS. 6, 7 and 8 and disclosed in U.S. Pat. No. 5,779,891.

Figure 6:
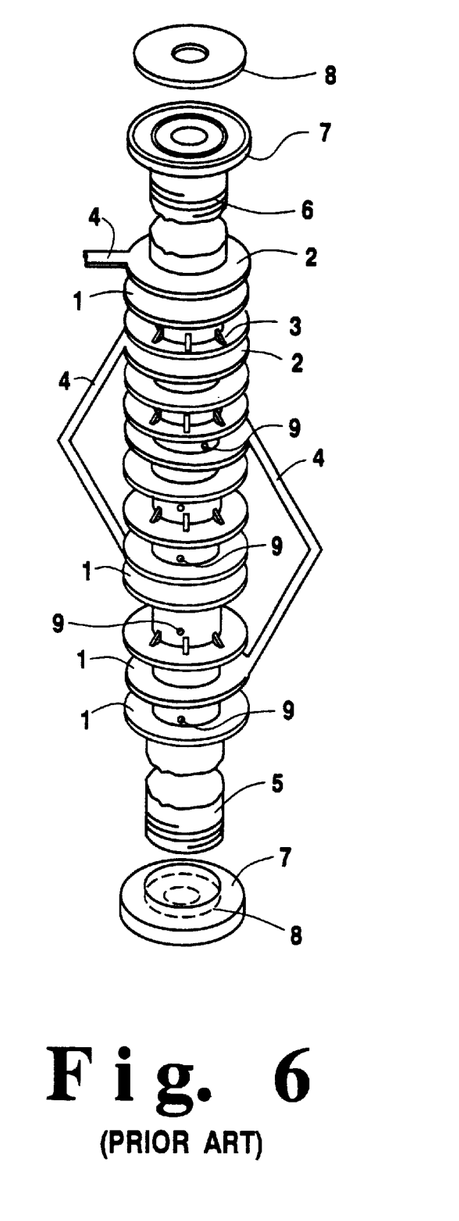
FIGS. 6,7 and 8 are perspective views of prior art flow-through capacitor configurations.

FIG. 6 shows a prior art stacked washer flow-through capacitor as shown in the above-noted U.S. Pat. No. 5,779, 891, whose high surface area electrodes contain a backing layer. The electrodes consist in combination of electrically conductive high surface area material 1 and conductive backing 2. The end electrodes may be either single or double sided, whereas the intermediate electrodes are preferably double sided. The electrical contact between the high surface area layer 1 and the conductive backing layer 2 is preferably a compression contact, which is afforded by the screw on end cap 7 tightened around central rod or tube 5 around threads 6. The electrodes are present in even numbers to form at least one anode/cathode pair. The anode and cathodes 10 formed are separated by spacers 5. Integral leads 4 extend from conductive backing (2).

These leads may be joined together to connect separately, in parallel alignment to themselves, the alternate anode and cathode layers, or they may be gathered together to accomplish the same purpose and to form an electrical lead.

Fluid flow is between the spaced apart electrodes and through the holes 9 and then out through the central tube 8. Instead of a tube with holes, a ribbed rod may be substituted with fluid flow alongside the longitudinal ribs.

Figure 7:
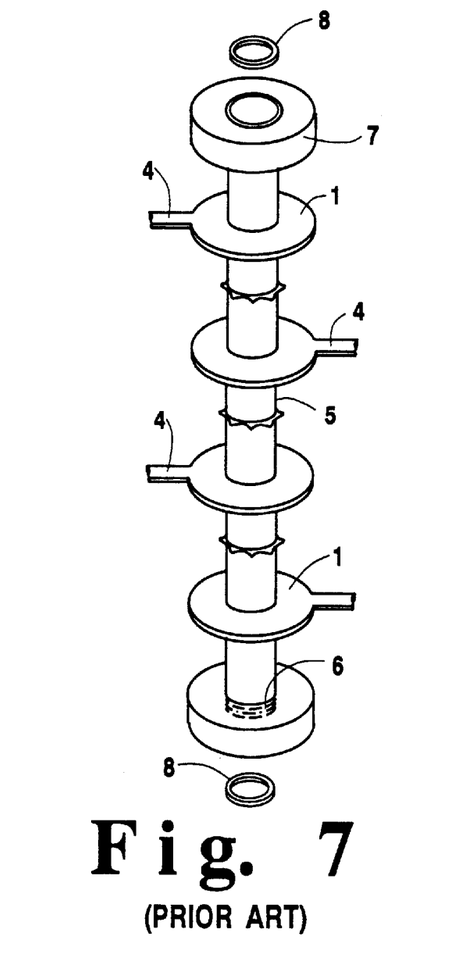

FIG. 7 shows a prior art washer style flow-through capacitor with high surface area electrodes that are sufficiently conductive that no conductive backing is required. Integral lead 4 are attached to high surface area conductive material 1, which forms alternating anode cathode pairs separated by spacers as shown in U.S. Pat. No. 5,779,891.

Figure 8:
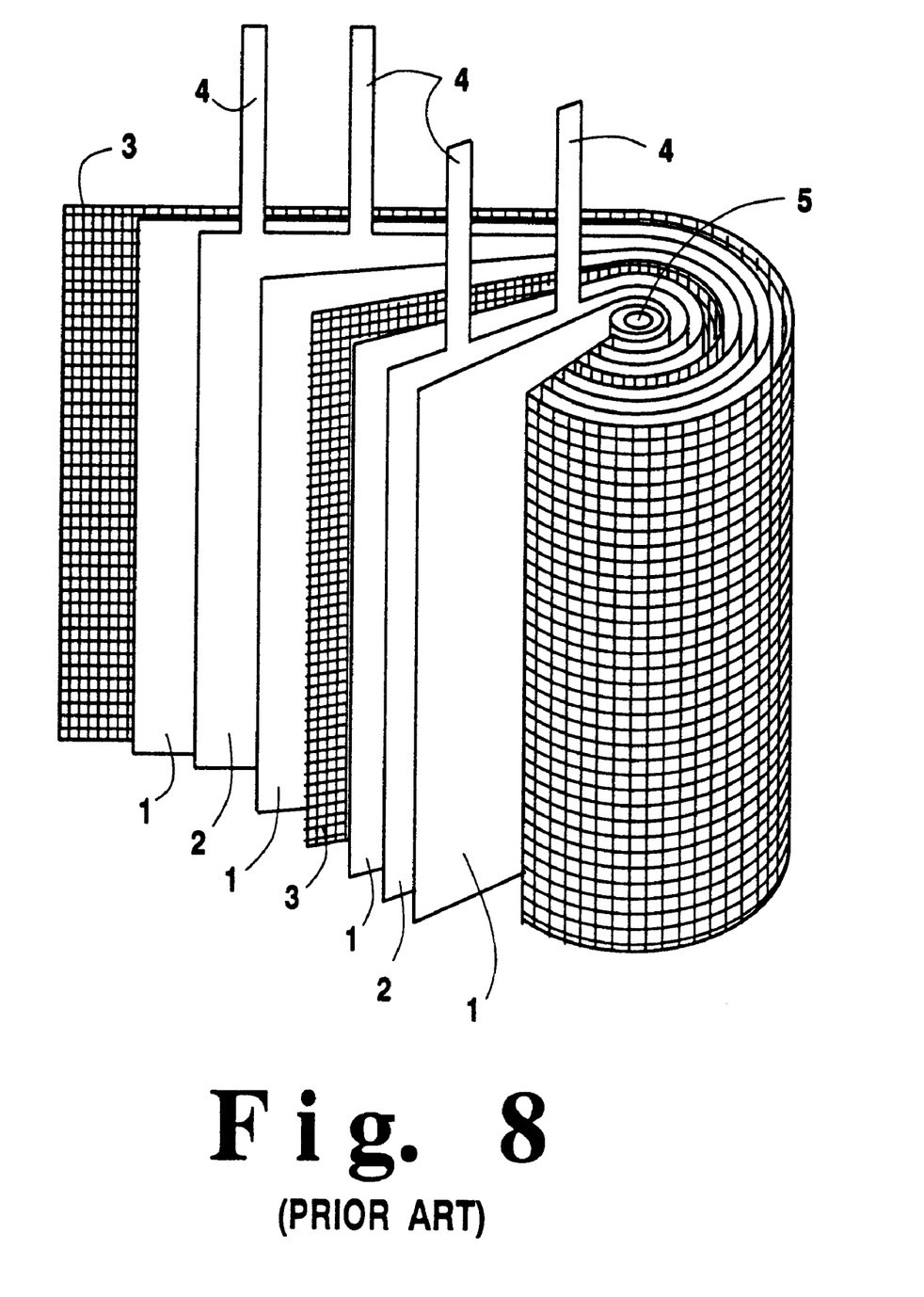

FIG. 8 depicts a spiral wound capacitor (disclosed in U.S. Pat. No. 5,779,891) utilizing conductive high surface area material 1, optional conductive backing 2, and spacing material 3 in a setting or open mesh form. Electric leads 4 extend from the electrodes formed from material 1 or the optional conductive backing 2. The capacitor may optionally be wound around a structural central rod 5. This capacitor is preferably made short and fat, with the width wider than the length of the capacitor as measured down the central axis.

Figure 9:
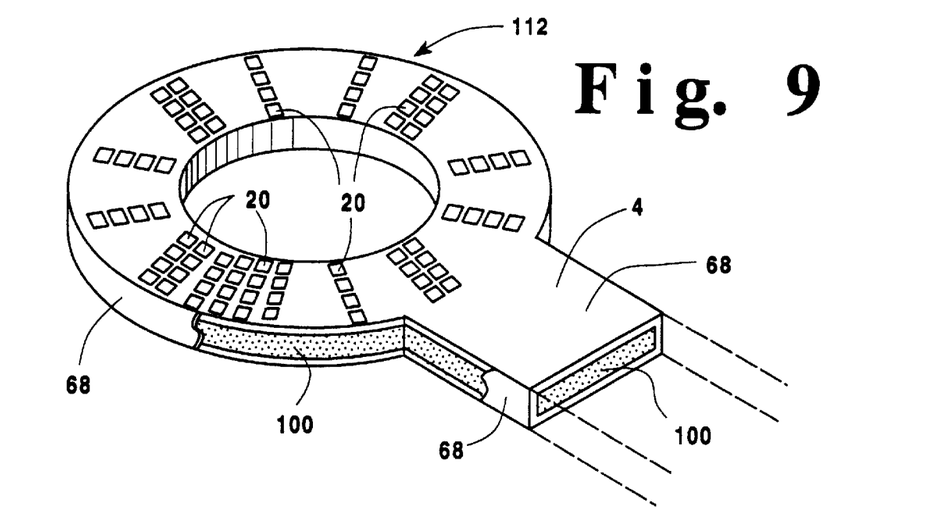
FIGS. 9,10 and 11 show articles in accordance with the present invention which can be substituted for components of the flow-through capacitors of FIGS. 5,6 and 7.
Figures 10, 11:
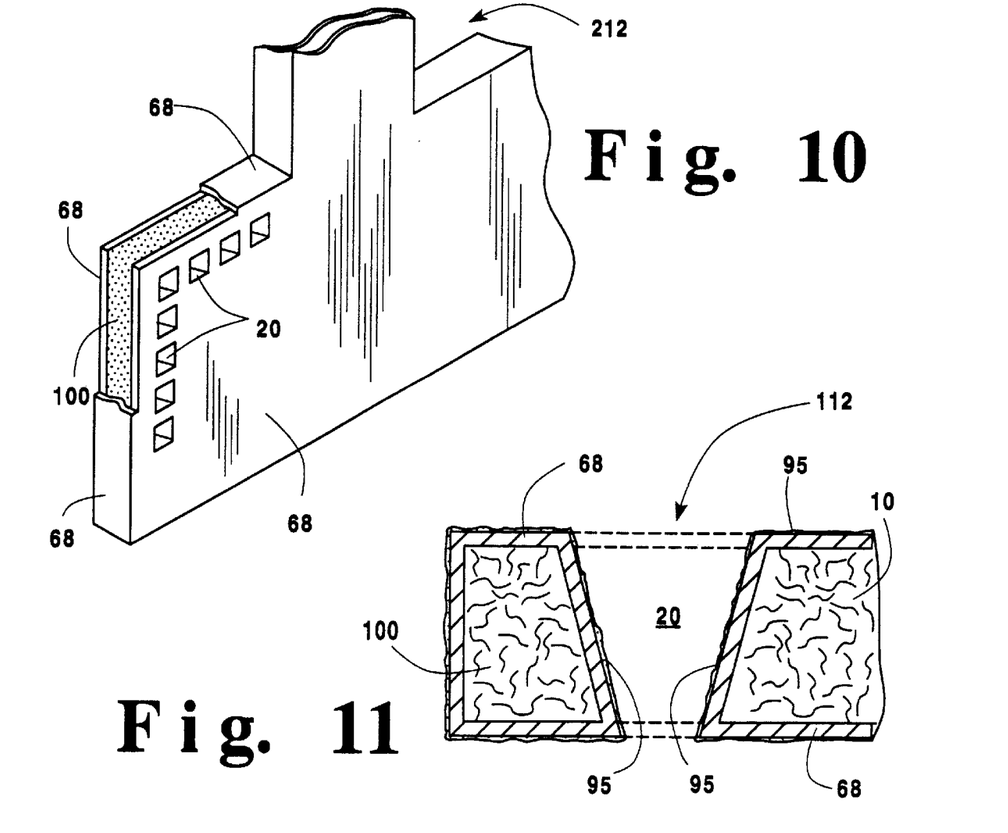

In the practice of the present invention, an article 112 such as shown in FIG. 9 is provided for use as an electrode in the flow-through prior art capacitor of FIG. 6, in substitution for the electrode 1 shown in FIG. 6. Also, article 112 of FIG. 9 is provided for use as an electrically conductive backing material in substitution of electrically conducting backing material 2 of FIG. 6. The article 112 of FIG. 9 comprises a perforated sheet of compressed expanded graphite 100, corresponding to sheet 10 of FIGS. 1 and 2, having transverse, open channels 20 formed as described hereinabove and an adherent coating of glassy carbon 68. The article 212 of FIG. 10 is provided for use as an electrode, or electrically conductive backing material in the flow-through capacitor of FIG. 8, in substitution for electrodes 1, and electrically conductive backing material 2. The article 212 of FIG. 10 comprises a perforated sheet of compressed expanded graphite 100 having open transverse channels 20, formed as described hereinabove, and an adherent glassy carbon coating 68 and is substitutable for the electrode 1, and backing material 2 of the capacitor of FIG. 8. FIG. 11 shows an electrode 112 for a flow-through capacitor in accordance with the present invention having an outer coating 95 of activated carbon particles bonded to glassy carbon coating 68 of sheet 100, formed of compressed expanded graphite particles and having transverse channels 20. The activated carbon particles are formed in situ by contacting a resin coated surface of flexible graphite sheet 100 with particles of natural cellulosic precursors, e.g. shredded paper, wood pulp, straw, cotton, and activating and carbonizing the cellulosic precursor in the course of heating and curing the resin coating to form glassy carbon. Additionally, natural cellulosic precursors, as described above can be admixed with the resin prior to coating of the flexible graphite sheet so that after heating, curing and activating the activated cellulosic precursors are incorporated and embedded within the glassy, carbon coating which enhances the development of a relatively thick activated glassy carbon coating. Procedures for activating and carbonizing cellulosic precursors is disclosed in U.S. Pat. No. 5,102,855, the disclosure of which is incorporated herein by reference.

In producing an article in accordance with the present invention, a sheet of compressed expanded graphite particles having transverse channels, as illustrated in FIG. 1 and FIG. 2, is treated, e.g. by dipping, with a solution of non-graphitizing, organic thermo-setting resin, e.g. liquid resol phenolic resin in furfural which may advantageously include the cellulosic precursors noted above. The solution covers and penetrates the surface of the sheet and is subsequently dried and heated to cure and thermoset the resin and thereafter heated to temperatures of 500° C. and higher, e.g. up to about 1600° C., to convert the thermoset resin to glassy carbon. In preparing a high surface area electrode such as shown in FIG. 11, particles of natural cellulosic materials, e.g. in the form of shredded newspaper, cotton linters, wood pulp, and the like are treated with an activating agent and applied to or incorporated within a resin coated sheet of compressed expanded graphite particles before the resin has fully dried. Thereafter the resin-coated sheet, with applied or incorporated natural cellulosic particles bonded thereto or embedded therein, is heated to cure and thermoset the resin and convert the resin to glassy carbon; in the course of this heat treatment, the applied and incorporated natural cellulosic particles are converted to high surface area activated carbon.

Preparation of glassy carbon surface to protect against corrosion, erosion and distortion (change in flatness):

a. A sheet of compressed expanded graphite particles is coated with a thermosettable organic resin by means of roll, spray, gauge, or dip methods depending upon the coating thickness desired;

b. The coated sheet is heated to dry and set the resin at a temperature of 130 to 235° C.

c. The dried sheet is mechanically impacted to form transverse channels as described hereinabove.

d. The channeled sheet is heat treated in an inert or halogen atmosphere to 500° C.–1600° C. to form the glassy carbon coating.

A high surface area strongly adhering coating is obtained by including 2 to 20 weight percent cellulosic material (e.g. milled newspaper) in the thermosettable resin. The cellulosic material suitably includes an activating material, e.g. phosphoric acid, and the cellulosic char, formed in and on the glassy carbon coating, and the surface of the glassy carbon coating is activated by heating in an oxidizing atmosphere at 700° C. for a few minutes.

Figure 12:
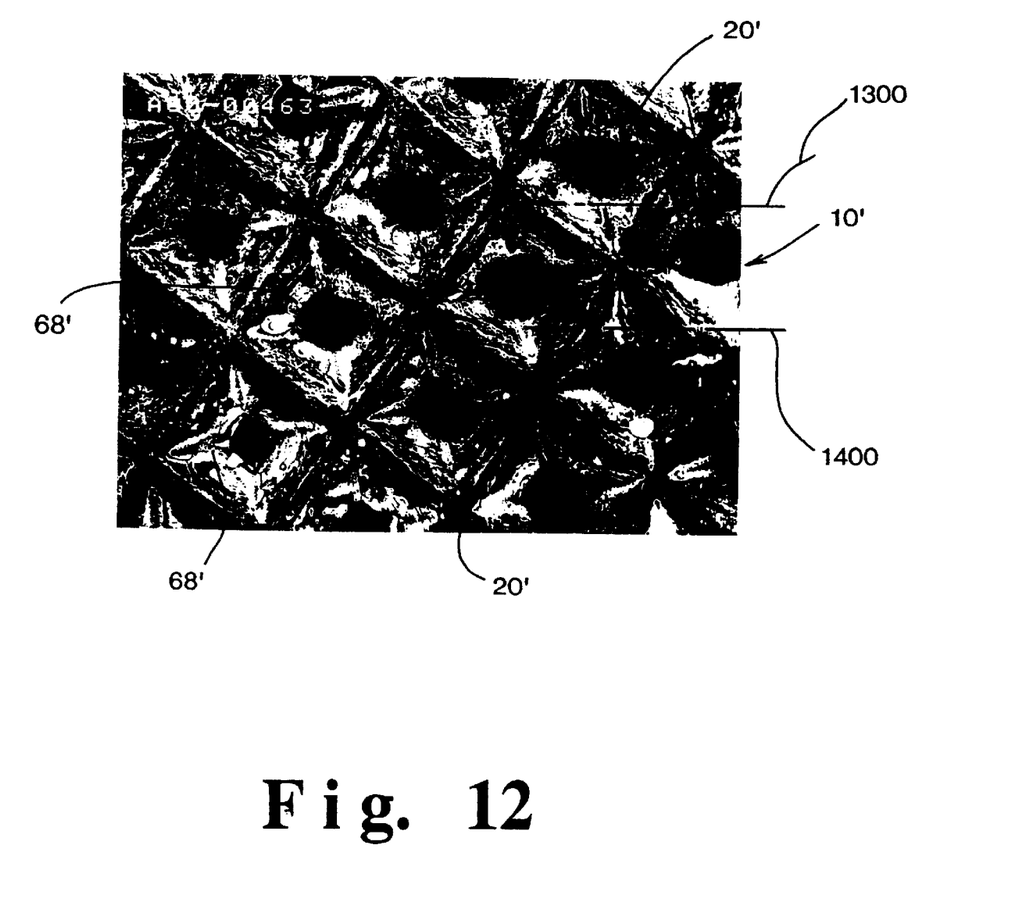
FIG. 12 is a scanning electron microscope photo (original magnification 54×) of the upper surface of material of the type shown in FIG. 5 which is in accordance with the present invention.

FIG. 12 is a photograph (original magnification 54×) of a body of flexible graphite having a glassy carbon coating corresponding to a portion of the sketch of FIG. 5.

The article of FIG. 5, representative of the material of FIG. 12, can be shown to have increased thermal and electrical conductivity in the direction transverse to opposed parallel, planar surfaces 30, 40 as compared to the thermal and electrical conductivity in the direction transverse to surfaces 130, 140 of prior art material of FIG. 4 in which particles of expanded natural graphite unaligned with the opposed planar surfaces are not optically detectable.

A sample of a sheet of glassy carbon coated flexible graphite 0.01 inch thick having a density of 0.3 grams/cc, representative of FIG. 4, was mechanically impacted by a device similar to that of FIG. 3 to provide channels in the flexible graphite sheet.

Figure 13:
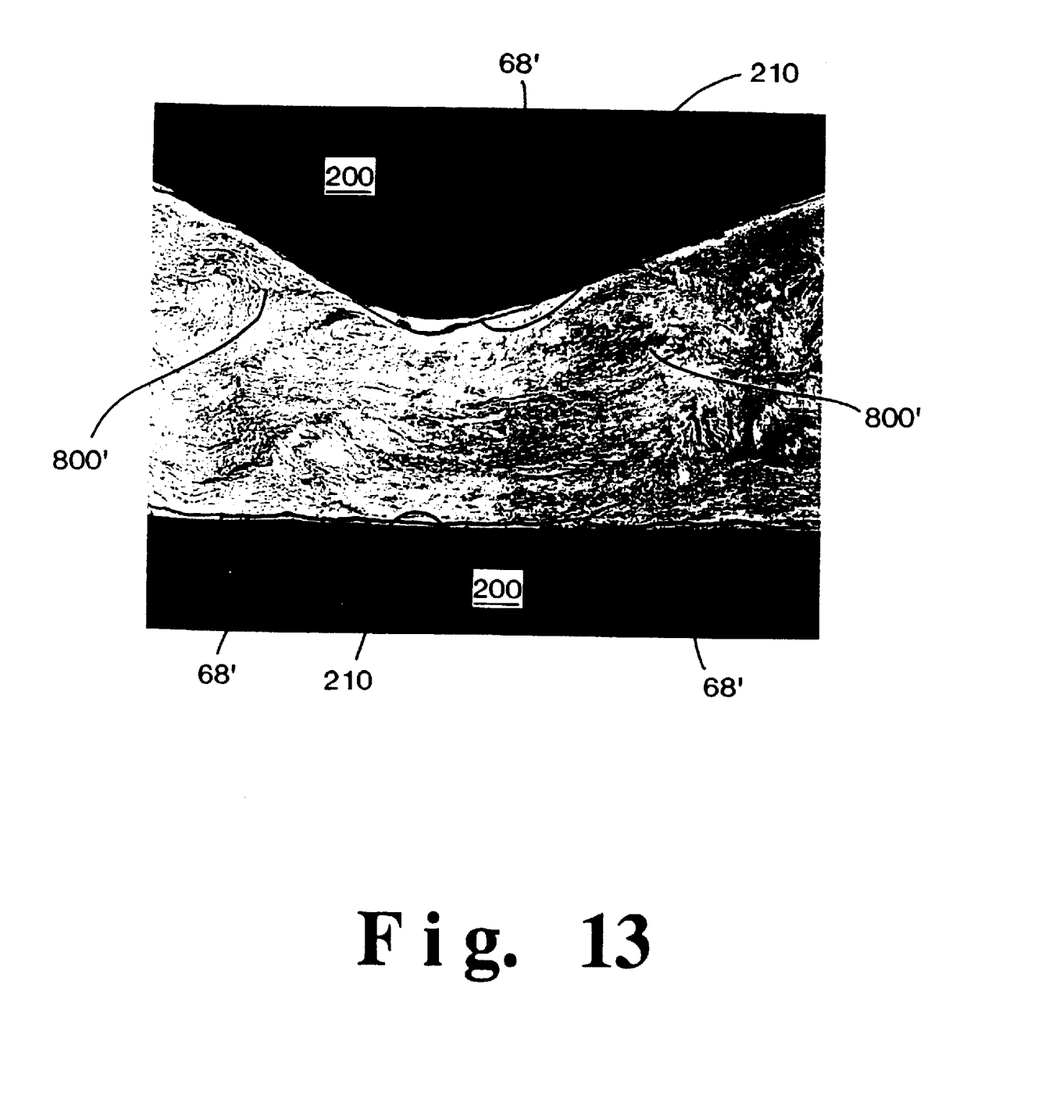
FIG. 13 is an optical microscope view (original magnification 500×) of a polished cross-section of the material of FIG. 12.
Figure 14:
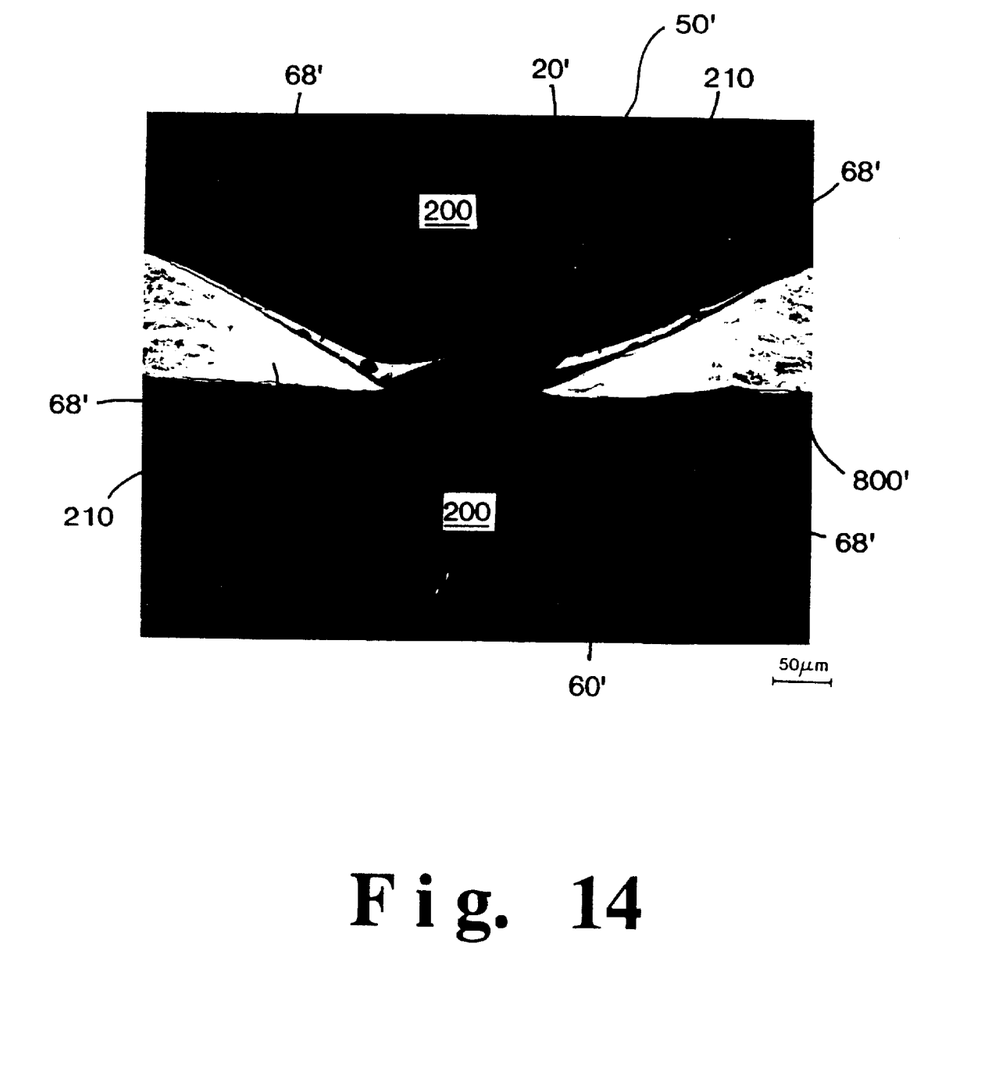
FIG. 14 is an optical microscope view (original magnification 200×) of a polished cross-section of the material of FIG. 12 which is at a different location from that of FIG. 13.

With reference to FIG. 12, the electron microscope view (500×) is a top plan view of the surface of a glassy carbon coated sheet of flexible graphite, i.e. compressed expanded particles of natural graphite, indicated at 10', having a glassy carbon coating indicated at 68'. Channels 20' extend transversely through the flexible graphite sheet 10'. FIGS. 13 and 14 are optical microscope views (500×) and (200×) respective of the cross-section of the material of FIG. 12 along planes corresponding to 1300, 1400 of FIG. 12.

The samples of FIGS. 13, 14 were prepared by epoxy potting pieces of the material of FIG. 12 and polishing the potted material with increasingly finer grit paper and finishing with diamond powder paste. In both FIGS. 13 and 14, epoxy potting material (dark gray) is indicated at 200 and pits and grooves, i.e. voids, due to graphite removal during polishing are indicated (dark black) at 210. The non-parallel orientation of the graphite is indicated at 800'. The glassy carbon coating is indicated at 68'. FIG. 14 shows a channel 20' with channel openings 50', 60'.

The transverse (across the thickness) electrical resistance of a sample of a sheet of flexible graphite having a coating of glassy carbon was measured prior to channel formation. The result is shown in the following table.

Also, the transverse gas permeability of channeled flexible graphite sheet samples, in accordance with the present invention, was measured, using a Gurley Model 4118 for Gas Permeability Measurement.

Samples of channeled flexible graphite sheet in accordance with the present invention were placed at the bottom opening (⅜ in. diam.) of a vertical cylinder (3 inch diameter cross-section). The cylinder was filled with 300 cc of air and a weighted piston (5 oz.) was set in place at the top of the cylinder. The rate of gas flow through the channeled samples was measured as a function of the time of descent of the piston and the results are shown in the table below.

| Flexible Graphite Sheet With Carbon Coating (Average Thickness = 5 Micron) (0.01 inch thick; density = 0.3 gms/cc) | | | |
|---|---|---|---|
| | No Channels | 1600 channels per square inch-0.020 inch wide at top; 0.005 inch wide at bottom | 250 channels per square inch-0.020 inch wide at top; 0.007 inch wide at bottom |
| Transverse Electrical Resistance (milliohms) | 5.2 | 3.7 | — |
| Diffusion Rate-Seconds | — | 8 | 30 |

In the present invention, for a flexible graphite sheet having a thickness of 0.003 inch to 0.015 inch adjacent the channels and a density of 0.3 to 1.5 grams per cubic centimeter, the preferred channel density is from 100 to 3000 channels per square inch.

In the practice of the present invention, the flexible graphite sheet can, at times, be advantageously treated with resin and the absorbed resin, after curing, enhances the moisture resistance and handling strength, i.e. stiffness of the flexible graphite sheet. Resin content is preferably 10 to 30% by weight, suitably up 60% by weight.

The article of the present invention can further be used as electrical and thermal coupling elements for integrated circuits in computer applications, as conformal electrical contact pads and as electrically energized grids in de-icing equipment.

The above description is intended to enable the person skilled in the art to practice the invention. It is not intended to detail all of the possible variations and modifications which will become apparent to the skilled worker upon reading the description. It is intended, however, that all such modifications and variations be included within the scope of the invention which is defined by the following claims. The claims are intended to cover the indicated elements and steps in any arrangement or sequence which is effective to meet the objectives intended for the invention, unless the context specifically indicates the contrary.

What is claimed is:

1. A fluid permeable graphite article comprising a compressed mass of expanded graphite particles in the form of a sheet having parallel, opposed first and second surfaces, at least a portion of said sheet having a plurality of transverse fluid channels passing through said sheet between said first and second parallel, opposed surfaces, said channels being formed by mechanically impacting the first surface of said sheet at a plurality of locations to provide said channels with openings at both of said first and second parallel, opposed surfaces, at least one of said parallel opposed surfaces having an adherent coating of glassy carbon.

2. Article in accordance with claim 1 wherein the channels are bounded by an inner surface having an adherent coating of glassy carbon.

3. Article in accordance with claim 1 wherein 100 to 3000 channels per square inch are present in said sheet.

4. Article in accordance with claim 1 wherein said graphite sheet has a thickness of 0.003 inch to 0.015 inch adjacent said channels and a density of 0.3 to 1.5 grams per cubic centimeter.

5. A fluid permeable graphite article comprising a compressed mass of expanded graphite particles in the form of a sheet having parallel, opposed first and second surfaces, said sheet having a plurality of transverse fluid channels passing through said sheet between said first and second parallel, opposed surfaces, said channels being formed by mechanically impacting the first surface of said sheet at a plurality of locations to displace graphite within said sheet at said locations and provide said channels with openings at both of said first and second parallel, opposed surfaces, at least one of said parallel opposed surfaces having an adherent coating of glassy carbon, and said channels are bounded by an inner surface having an adherent coating of glassy carbon.

6. A fluid permeable graphite electrically conductive backing material for use in a flow-through, electrical capacitor, comprising a compressed mass of expanded graphite particles in the form of a sheet having parallel, opposed first and second surfaces, said sheet having a plurality of transverse fluid channels passing through said sheet between said first and second parallel, opposed surfaces, said channels being formed by mechanically impacting the first surface of said sheet at a plurality of locations to provide said channels with openings at both of said first and second parallel, opposed surfaces, at least one of said parallel opposed surfaces having an adherent coating of glassy carbon.

7. Backing material in accordance with claim 6 wherein both of said parallel opposed surfaces have an adherent coating of glassy carbon.

8. Backing material in accordance with claim 6 wherein 100 to 3000 channels per square inch are present in said sheet.

9. Backing material in accordance with claim 6 wherein said graphite sheet has a thickness of 0.003 inch to 0.015 inch adjacent said channels and a density of 0.3 to 1.5 grams per cubic centimeter.

10. Backing material in accordance with claim 6 wherein at least a portion of the glassy carbon coating is activated.

11. Backing material in accordance with claim 6 wherein carbonized and activated natural cellulosic particles are incorporated within said glassy carbon coating.

12. A fluid permeable graphite electrically conductive backing material for use in a flow-through electrical capacitor comprising a compressed mass of expanded graphite particles in the form of a sheet having parallel, opposed first and second surfaces, said sheet having a plurality of transverse fluid channels passing through said sheet between said first and second parallel, opposed surfaces, said channels being formed by mechanically impacting the first surface of said sheet at a plurality of locations to displace graphite within said sheet at said locations and provide said channels with openings at both of said first and second parallel, opposed surfaces, at least one of said parallel opposed surfaces having an adherent coating of glassy carbon.

13. A fluid permeable graphite electrode for use in a flow-through electrical capacitor comprising a compressed mass of expanded graphite particles in the form of a sheet having parallel, opposed first and second surfaces, said sheet having a plurality of transverse fluid channels passing through said sheet between said first and second parallel, opposed surfaces, said channels being formed by mechanically impacting the first surface of said sheet at a plurality of locations to provide said channels with openings at both of said first and second parallel opposed surfaces, at least one of said parallel opposed surfaces having an adherent coating of glassy carbon.

14. Electrode in accordance with claim 13 wherein both of said parallel opposed surfaces have an adherent coating of glassy carbon with respect to said parallel opposed surfaces.

15. Electrode in accordance with claim 13 wherein carbonized and activated natural cellulosic fibers are bonded to said glassy carbon coating.

16. Electrode in accordance with claim 13 wherein 100 to 3000 channels per square inch are present in said sheet.

17. Electrode in accordance with claim 13 wherein said graphite sheet has a thickness of 0.003 inch to 0.015 inch adjacent said channels and a density of 0.3 to 1.5 grams per cubic centimeter.

18. Electrode in accordance with claim 13 wherein at least a portion of the glassy carbon coating is activated.

* * * * *